United States Patent
Malshe et al.

(10) Patent No.: US 11,599,286 B2
(45) Date of Patent: Mar. 7, 2023

(54) DATA AGE AND VALIDITY-BASED MEMORY MANAGEMENT

(71) Applicant: Micron Technology, Inc., Boise, ID (US)

(72) Inventors: Ashutosh Malshe, Fremont, CA (US); Vamsi Pavan Rayaprolu, San Jose, CA (US); Kishore K. Muchherla, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 43 days.

(21) Appl. No.: 17/337,566

(22) Filed: Jun. 3, 2021

(65) Prior Publication Data
US 2022/0391088 A1    Dec. 8, 2022

(51) Int. Cl.
*G06F 3/06* (2006.01)

(52) U.S. Cl.
CPC ............ *G06F 3/064* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2010/0199019 A1* | 8/2010 | Fisher | G06F 3/0659 711/E12.008 |
| 2014/0231954 A1 | 8/2014 | Lue | |
| 2016/0179386 A1 | 6/2016 | Zhang | |
| 2017/0220623 A1* | 8/2017 | Blount | G06F 12/0269 |
| 2018/0285258 A1* | 10/2018 | Muchherla | G06F 12/0246 |
| 2018/0349041 A1* | 12/2018 | Zhou | G06F 12/0804 |
| 2021/0157723 A1* | 5/2021 | Byun | G06F 12/0891 |

FOREIGN PATENT DOCUMENTS

WO        2017074570 A1        5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Sanjiv Shah
*Assistant Examiner* — Elias Young Kim
(74) *Attorney, Agent, or Firm* — Brooks, Cameron & Huebsch, PLLC

(57) ABSTRACT

A method includes determining respective valid translation unit counts of a block of non-volatile memory cells over a period of time, determining a rate of change of the respective valid translation unit counts of the block of non-volatile memory cells over the period of time, comparing the rate of change of the valid translation unit counts to a bin transition rate, and based on comparing the rate of change of the valid translation unit counts to the bin transition rate, performing a media management operation on the block of non-volatile memory cells.

18 Claims, 5 Drawing Sheets

DATA AGE AND VALIDITY-BASED MEMORY MANAGEMENT

TECHNICAL FIELD

Embodiments of the disclosure relate generally to memory sub-systems, and more specifically, relate to data age and validity-based memory management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
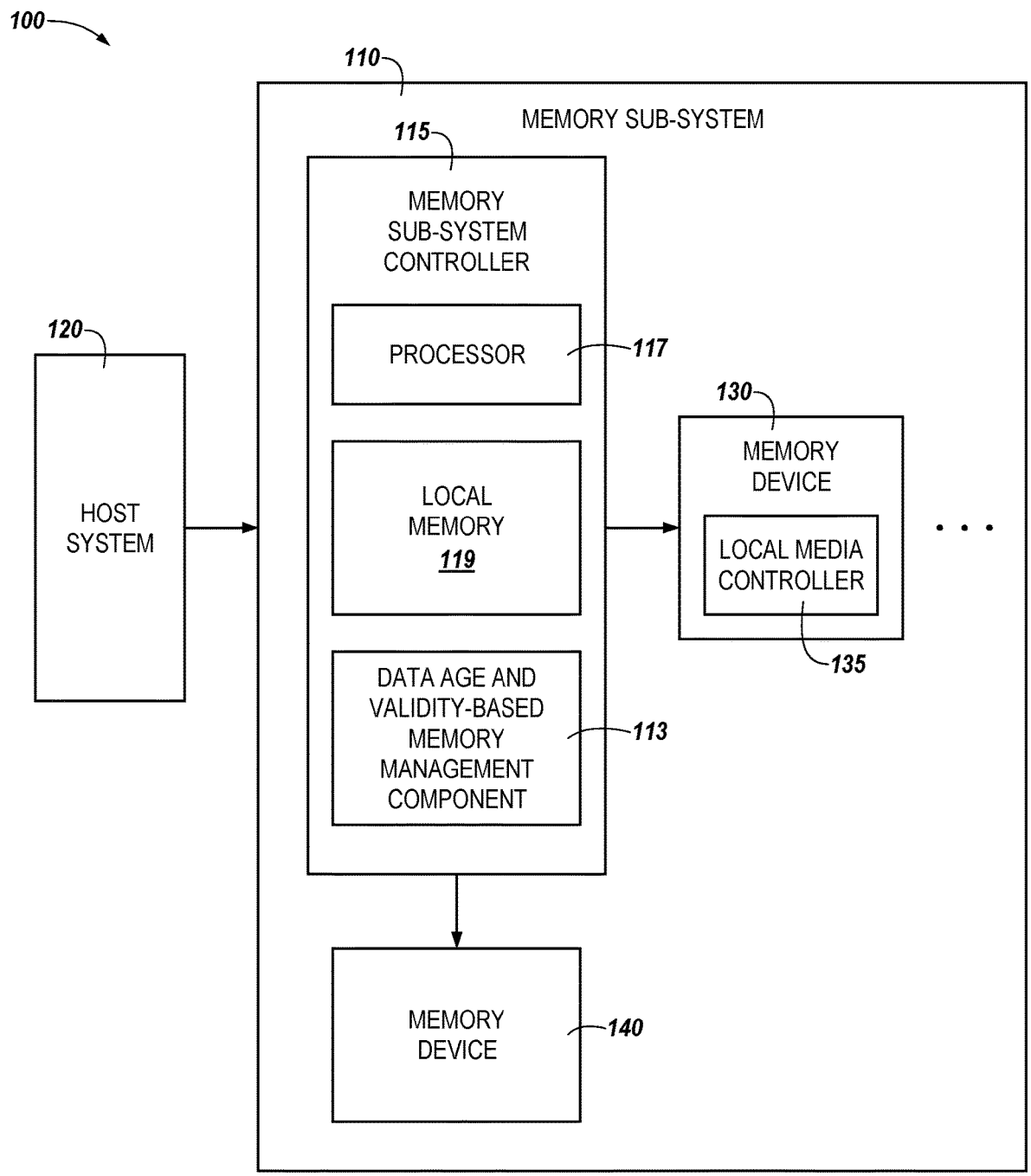
FIG. 1 illustrates an example computing system that includes a memory sub-system in accordance with some embodiments of the present disclosure.

Aspects of the present disclosure are directed to data age and validity-based memory management, in particular to memory sub-systems that include a data age and validity-based memory management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Media management operations can be performed on the memory blocks. Non-limiting examples of media management operations can include error correction operations, wear leveling operations, write disturb mitigation operations, and/or garbage collection operations. Media Management operation can be referred to in the alternative as "memory management operations," herein.

A "wear leveling operation" generally refers to an operation performed on one or more memory blocks to control the wear rate of such memory blocks. Wear leveling operations can reduce the number of process cycles (e.g., program and/or erase cycles) performed on a particular group of memory blocks by spreading such cycles more evenly over an entire memory array and/or memory device. Examples of wear leveling operations include static wear leveling operations and dynamic wear leveling operations.

A "dynamic wear leveling operation" generally refers to the process of block stripe selection for erases and new writes by program-erase cycle (PEC) count. As used herein, a "block stripe" generally refers to a logical grouping of memory blocks that share a same upper block number and can be accessed in parallel. As used herein, the "PEC count" generally refers to the number of times a NAND block has been accessed (e.g., programmed and/or erased), which is an indicator of block wear.

A "static wear leveling operation" generally refers to a process of collecting and folding long resident drive data (cold data) into a block stripe that has higher wear than others in the system. Ideally the worn block stripe is entirely filled with "cold" data. In the event there is not enough "cold" data to entirely fill the block stripe, the remainder is filled with the "coldest" data available. By putting "cold" data into a "hot" block stripe, the difference between minimum and maximum block stripe PEC counts should be able to be kept within a reasonable range due to the high longevity of the data reducing the need for the block stripe to be folded and later erased. This separation of "cold" data into "hot" block stripes provides benefits in drive endurance, reduced write amplification, and performance benefits (such as reduced overhead in concurrently maintaining sets of NAND trim voltage levels).

A "garbage collection operation" generally refers to a process of folding data from a victim block stripe into a new destination block stripe, with the intended purpose of data consolidation to free up memory resources for subsequent program/erase cycles. Garbage collection operations can include reclaiming (e.g., erasing and making available for programming) memory blocks that have the most invalid pages among blocks in the memory device(s). In some embodiments, garbage collection can include reclaiming memory blocks with more than a threshold amount (e.g., quantity) of invalid pages. However, if sufficient free memory blocks exist for a programming operation, then a garbage collection operation may not occur. Garbage collection can generally be performed in the background (e.g., during idle time of the memory); however, in some embodiments, garbage collection can be performed in the foreground, for instance in response to a determination that an amount of free memory blocks has decreased below a threshold free block count. However, the garbage collection operation can utilize read and write operations that result in write amplification, which can increase memory sub-system (e.g., SSD) power consumption and can decrease the lifespan of the memory sub-system, for example, since the memory cells can become unusable after experiencing a certain number of program/erase cycles.

Wear leveling operations and garbage collection operations can be performed on a selected source block. Some previous garbage collection approaches can track (e.g., via a data structure such as a table) a quantity of valid physical translation units (PTUs) per block (e.g., a valid translation count (VTC)) and then select a block having the lowest VTC as a source block. Some previous wear leveling operations can include tracking (e.g., via a data structure such as a table) a bin associated with a memory block. The bin associated with a memory block can indicate an age of data in the memory block. Such approaches can select a memory block having the highest bin index (e.g., the oldest data) as a source block.

Efficiency (e.g., an amount of bus traffic, an amount of computing overhead, etc.) associated with a media management operation can vary. For instance, memory blocks can be filled with both valid data portions and invalid data portions. As used herein, "valid data portions" generally refer to data corresponding to a page having a current (e.g., up to date) logical to physical mapping entry, while "invalid data portions" generally refer to data corresponding to a page whose mapping entry is stale (e.g., the corresponding logical page has been remapped to a new physical page). Stated alternatively, valid data portions can generally include "hot data," while invalid data portions can generally include "cold data." Due to the behavior of write operations memory sub-systems, the valid data portions can be relatively small or be less than a particular threshold amount of valid data in comparison to an amount of invalid data portions. Efficiencies associated with a media management operation can vary depending on a given the amount of valid data portions, a rate of change in the amount of valid data portions, and/or an age of data.

Thus, by not accounting for an amount of valid data portions, a rate of change in the amount of valid data portions, and an age of the data, the memory sub-system can experience degraded performance with approaches that use VTC or an age of data as a sole criterion for source block selection. This degradation of performance can be undesirable, especially in critical applications and/or in applications in demanding applications in which very high memory sub-system performance is expected. Further, this degraded performance that can be exhibited in such approaches can be further exacerbated in mobile (e.g., smartphone, internet of things, etc.) memory deployments in which an amount of space available to house a memory sub-system is limited in comparison to traditional computing architectures.

Aspects of the present disclosure address the above and other deficiencies by comparing the rate of change of the valid translation unit counts of a block to a bin transition rate, and based on comparing the rate of change of the valid translation unit counts of the block to the bin transition rate, performing a media management operation on the block. For instance, as detailed herein a garbage collection operation and/or a wear leveling operation can be performed on a memory block based on comparing the rate of change of the valid translation unit counts to the bin transition rate. Thus, by performing the media management operation on the memory block on based on comparing the rate of change of the valid translation unit counts to the bin transition rate memory sub-system performance can be improved in comparison to approaches in which source block selection (and therefore a type of resultant media management operation) is solely based on having the lowest VTC or the highest bin index. Embodiments herein can be applied in mobile memory deployments to further improve the reliability of a memory sub-system deployed in a mobile computing architecture.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a data age and validity-based memory management component 113. Although not shown in FIG. 1 so as to not obfuscate the drawings, the data age and validity-based memory management component 113 can include various circuitry to facilitate determining a rate of change of the respective valid translation unit counts of a memory block, comparing the rate of change of the valid translation unit counts to a bin transition rate, and based on comparing the rate of change of the valid translation unit counts to the bin transition rate, performing a media management operation on the memory block. In some embodiments, the data age and validity-based memory management component 113 can include special purpose circuitry in the form of an ASIC, FPGA, state machine, and/or other logic circuitry that can allow the data age and validity-based memory management component 113 to orchestrate and/or perform operations to selectively perform media management operations for the memory device 130 and/or the memory device 140 based at least on comparing a rate of change of valid translation unit counts to a bin transition rate.

In some embodiments, the memory sub-system controller 115 includes at least a portion of the data age and validity-based memory management component 113. For example, the memory sub-system controller 115 can include a processor 117 (processing device) configured to execute instructions stored in local memory 119 for performing the operations described herein. In some embodiments, the data age and validity-based memory management component 113 is part of the memory sub-system 110, an application, or an operating system.

In a non-limiting example, an apparatus (e.g., the computing system 100) can include a memory sub-system data age and validity-based memory management component 113. The memory sub-system data age and validity-based memory management component 113 can be resident on the memory sub-system 110. As used herein, the term "resident on" refers to something that is physically located on a particular component. For example, the memory sub-system data age and validity-based memory management component 113 being "resident on" the memory sub-system 110 refers to a condition in which the hardware circuitry that comprises the memory sub-system data age and validity-based memory management component 113 is physically located on the memory sub-system 110. The term "resident on" may be used interchangeably with other terms such as "deployed on" or "located on," herein.

The memory sub-system data age and validity-based memory management component 113 can be configured to determine respective rates of change in an amount of valid data (e.g., a VTC) and/or respective bin transition rates of NAND memory blocks (e.g., blocks of NAND memory cells) over a period of time. As described above, the memory components can be memory dice or memory packages that form at least a portion of the memory device 130. In some embodiments, the blocks of memory cells can form one or more "superblocks." As used herein, a "superblock" generally refers to a set of blocks that span multiple memory dice and are written in an interleaved fashion. For instance, in some embodiments each of a number of interleaved NAND memory blocks can be deployed across multiple memory dice that have multiple planes and/or pages associated therewith. The terms, "block," "block of memory cells," and/or "interleaved NAND memory blocks," as well as variants thereof, can, given the context of the disclosure, be used interchangeably.

In some embodiments, the memory sub-system data age and validity-based memory management component 113 can be further configured to determine VTCs of the blocks of memory cells (e.g., an amount of valid data). The respective VTCs can be determined based on the respective amount of the valid translation units in blocks of memory cells. The VTC can be expressed as a percentage of valid translation units in a total amount of translation units in an entire memory block or portion of a memory block. For instance, a respective VTC can be determined for an entire memory block of memory cells such as for all pages, planes, and dice of the block of memory cells. However, in some embodiments, a VTC can be determined for a portion of, but not all of, a block of memory cells. The terms "valid translation unit count," "VTC," and/or "an amount of valid data," as well as variants thereof, can, given the context of the disclosure, be used interchangeably The memory sub-system data age and validity-based memory management component 113 can be further configured to determine a rate of change of the respective valid translation unit counts of the memory block over a period of time. A rate of change of the respective valid translation units can represent a level by which the amount of valid data in memory blocks has decreased over a period of time. For instance, a rate of change of the respective valid translation units of NAND memory blocks can represent a level by which the amount of valid data in the NAND memory blocks has decreased over a period of time.

The memory sub-system data age and validity-based memory management component 113 can perform a media management operation such as garbage collection operation or a wear leveling operation (e.g., a static-wear leveling operation) on a block of memory cells. For example, the memory sub-system data age and validity-based memory management component 113 can perform a media management operation based on comparison of a rate of change of the VTC to a bin transition rate, as described herein.

Figure 2:
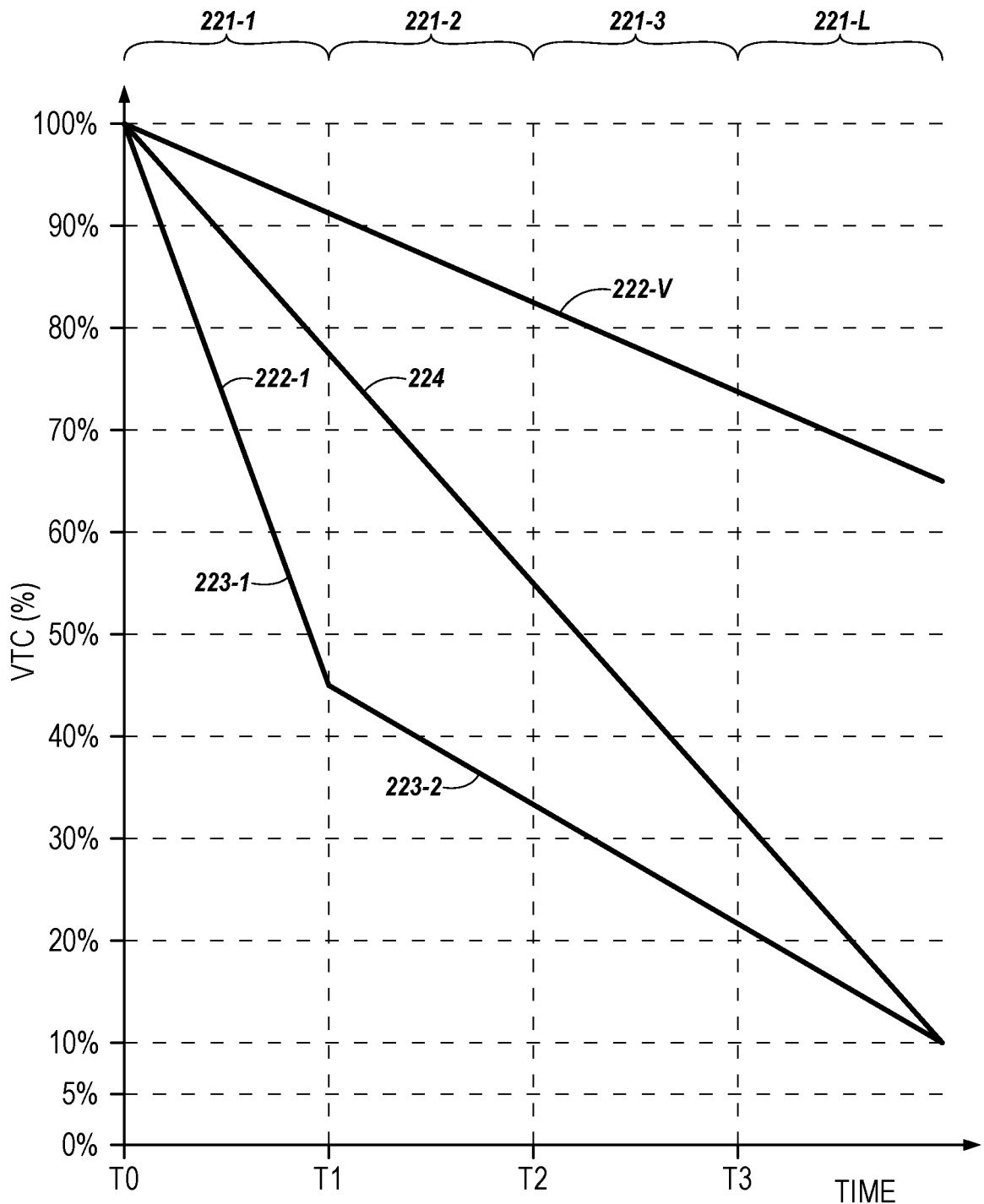
FIG. 2 is a graph illustrating various rates in accordance with some embodiments of the present disclosure.

FIG. 2 is a graph illustrating various rates in accordance with some embodiments of the present disclosure. As illustrated in FIG. 2, in one embodiment, a data age and validity-based memory management component 113 can determine an amount of valid data on a memory block and a bin associated with the memory block at a number of different points in time (e.g., $t_0$, $t_1$, $t_2$, $t_3$, etc.) of a period of time (e.g., a period of time from $t_o$ to $t_3$).

The bin associated with the memory block can represent an age of an amount of valid data in the memory block. An age of the amount of valid data can refer to an amount of time elapsed time since a previous read and/or write of the memory block and/or an amount of charge loss in the memory block. Charge loss can be evidenced by a temporal voltage shift in the memory block. As used herein, a temporal voltage shift (TVS) generally refers to the change in the measured voltage of cells as a function of time.

As age of the valid data increases, a bin associated with a memory block can be incremented to a bin having a progressively higher bin index (e.g., an older bin) responsive to aging of the memory block. For instance, a bin associated with a memory block can be changed responsive to an age of the amount of valid data satisfying a bin threshold. As used herein, satisfying a bin threshold generally refers to meeting or exceeding a value. For instance, valid data associated with a first bin (e.g., bin 221-1) can increase in age until satisfying a bin threshold of the second bin (e.g., bin 221-2). Responsive to the valid data satisfying the bin threshold of the second bin, the memory block can be associated with the second bin (e.g., 222-2). Bin thresholds at which an amount of valid data is associated with another bin can be predefined (e.g., corresponding to predetermined time following read/write times) or vary for instance depending on a system parameter.

Thus, a given bin associated with a memory block can represent a level by which an age of the amount of valid data in the memory block has increased over a period of time. For example, an age of valid data can progressively increase from an age associated with a first bin 221-1 having a lowest bin index (at $t_0$), to an age associated with a second bin 221-2 having a higher bin index (at $t_1$), then to an age associated with a third bin 221-3 having a yet higher bin index (at $t_2$), and finally to an age associated with a fourth bin 221-L having the highest bin index and thus representing having the oldest data (at $t_3$), as illustrated in FIG. 2. While FIG. 2 illustrates a total of four bins and four time increments it is understood that a total number of bins and/or a total number of time increments can be varied.

In some embodiments, an amount of valid data can be determined responsive to a bin transition. As used herein, a bin transition generally refers to a condition in which valid data reaches an age at which it become associated to a different bin (e.g., when valid data reaches an age to be changed from being associated with the bin 221-1 to the other bin 221-2, etc.) associated with a memory block. An amount of valid data can be determined responsive to each bin transition of multiple bin transitions.

From these amounts of valid data on the memory block and bins associated with the memory block at a number of different points in time, the data age and validity-based-memory management component 113 can determine the rate of change in the valid data and/or bins associated with the memory block. In one embodiment, the data age and validity-based-memory management component 113 can calculate a slope representing the rate of change and/or can predict, based on the past values, a rate of change for the amount of valid data in the memory block in the future. For example, data age and validity-based-memory management component 113 can apply a curve fitting algorithm (e.g., interpolation, smoothing, regression analysis, extrapolation, algebraic, geometric, etc.) to calculate the slope and/or machine learning (e.g., instance-based, regression analysis, regularization, classifiers, etc.) to make the predictions. Similarly, in one embodiment, the data age and validity-based memory management component 113 can calculate a slope representing the rate of change and/or can predict, based on the past values, a rate of change of the bins associated with the memory block (i.e., a bin transition rate) in the future.

In such embodiments, the data age and validity-based memory management component 113 can determine a bin transition rate as an average of the respective bin transition rates of the memory blocks. For, instance, as illustrated in FIG. 2, a bin transition rate 224 can be an average bin transition rate of respective bin transition rates of the memory blocks. While illustrated in FIG. 2 as being linear, the bin transition rate 224 can be non-linear or can include at least one non-linear segment.

In some embodiments, the data age and validity-based memory management component 113 can determine the rate of change of the respective translation unit counts of the memory blocks and determine the respective bin transition rates of the memory blocks over the same period of time. For instance, the rate of change of the respective translation unit counts and the respective bin transition rates of the memory blocks can each be determined over a period of time from $t_0$ to $t_3$ as illustrated in FIG. 2. However, in some embodiments the rate of change of the respective translation unit counts and/or the respective bin transition rates of the memory blocks can be determined over different periods of time.

As mentioned, in some embodiments, the data age and validity-based memory management component 113 can perform a media management operation on the memory block. For instance, in some embodiments the data age and validity-based memory management component 113 can perform the media management operation on the memory block at least in part by performing a folding operation on the memory block. As used herein, "folding" is the migration of data from one memory device location (e.g., NAND location) to another memory device (e.g., NAND location) location independent of any direct host interaction. Folding can be performed to pack valid data together, for example, as part of garbage collection operations, which can then free more memory device storage space for operations (e.g., new writes, error avoidance operations, wear leveling operations, restoring RAIN parity protection in the event of an error).

Media management operations can be performed in the "foreground" (e.g., during a time when a host is utilizing an interface associated with the memory sub-system) and/or in the "background" (e.g., when the host is not utilizing the interface associated with the memory sub-system). For instance, in some embodiments, the data age and validity-based memory management component 113 can perform a foreground folding operation or a background folding operation. For example, the data age and validity-based memory management component 113 can perform a foreground folding operation or a background folding operation on valid data in the respective valid translation units in a memory candidate block.

As mentioned, a rate of change of valid translation unit counts (represented as the line 222-1) can be compared to the bin transition rate (represented as the line 224). As illustrated in FIG. 2, the rate of change of the valid translation unit counts 222-1 is greater (e.g., has a larger magnitude) than the bin transition rate 224. For instance, for at least a first segment 223-1 (from $t_0$ to about $t_1$) the rate of change of the valid translation unit counts 222-1 is greater than the bin transition rate 224. As a result, the first segment 223-1 and the second segment 223-2 which are each located below the bin transition rate 224 in FIG. 2, and therefore each represent a rate of change that is greater than the bin transition rate 224. Note, the rate of change of the valid translation unit counts 222-1 varies between a first segment 223-1 and a second segment 223-2, as illustrated in FIG. 2. That is, a rate of change of the valid translation unit counts can vary over a period of time. However, in some instances the rate of change of the valid translation unit counts can be constant over a period of time. For instance, a rate of change of the valid translation unit counts of another memory block (represented as line 222-V) is constant over the period of time from $t_0$ to $t_3$ (e.g., has the same slope along an entire length from $t_0$ to $t_3$).

In some embodiments, a garbage collection operation can be performed on a memory block having a rate of rate of change of the valid translation units counts (e.g., 222-1) that is greater than or equal to a bin transition rate (e.g., 224). Examples of types of garbage collection operations can include foreground garbage collection operations (i.e., garbage collection operations performed while an I/O transaction encumbering a host such as the host system 120 illustrated in FIG. 1 is occurring) and background garbage collection operations (i.e., garbage collection operations performed in the absence of an I/O transaction encumbering the host).

However, in some embodiments a rate of change of the valid translation unit counts can be less than a bin transition rate. For instance, a rate of change of the valid translation unit counts of another memory block (e.g., as represented by a slope the line 222-V) is less than the bin transition rate 224, as illustrated in FIG. 2. Stated differently, the rate of change of the valid translation units 222-V can be less (e.g., have a smaller magnitude) than the bin transition rate 224 at a given time. As a result, the rate of change of the valid translation unit counts 222-V can be located above the bin transition rate 224 as illustrated in FIG. 2.

In some embodiments, a wear leveling operation can be performed on the memory block having the rate of change of the valid translation units (e.g., 222-V) that is less than a bin transition rate (e.g., 224). For instance, a static wear leveling operation or a dynamic wear leveling operation can be performed on the memory block having the rate of change of the valid translation units that is less than the bin transition rate.

Figure 3:
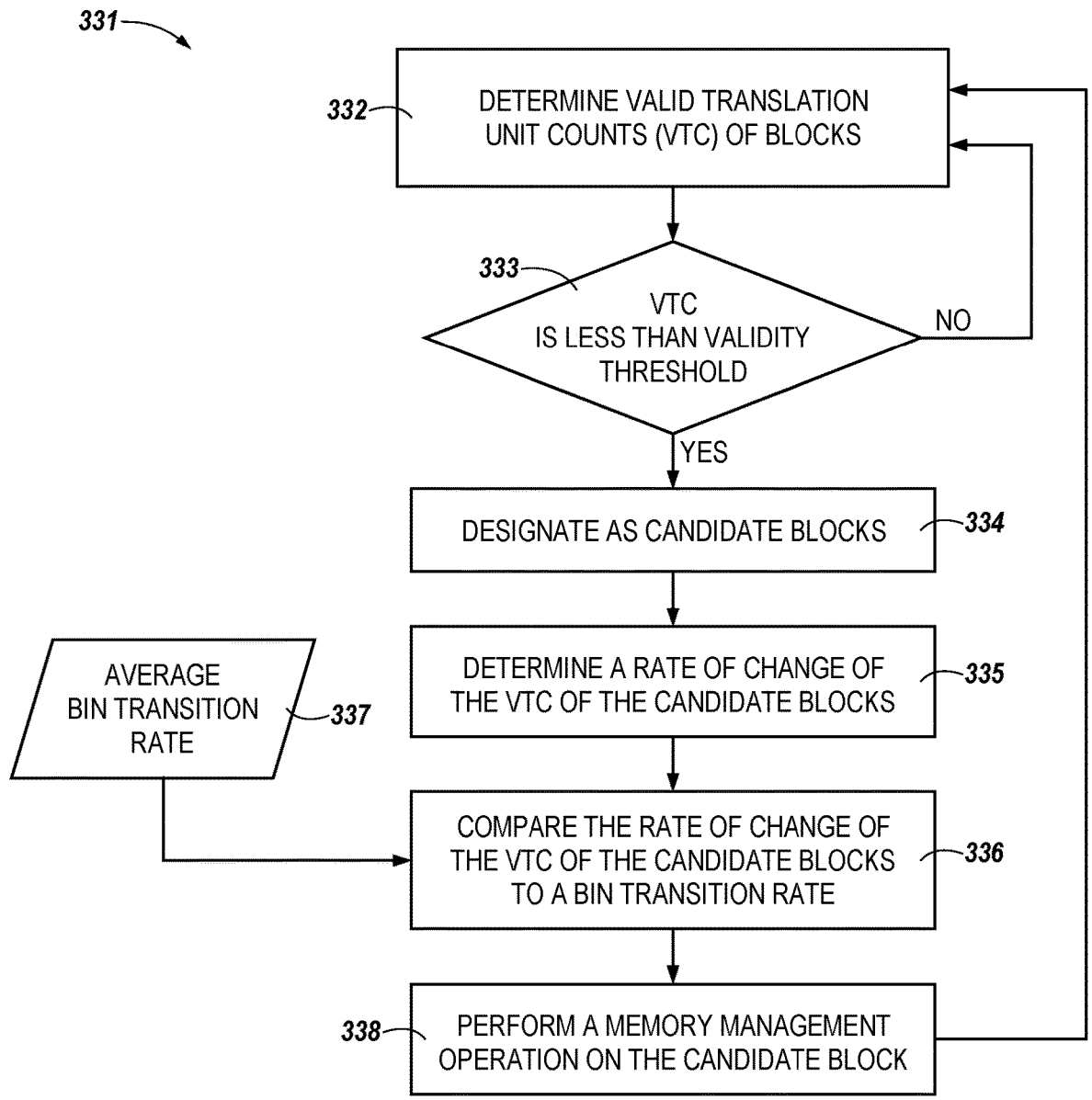
FIG. 3 is a flow diagram corresponding to a method for data age and validity-based memory management in accordance with some embodiments of the present disclosure.

FIG. 3 is a diagram of a flow 331 corresponding to data age and validity-based memory management in accordance with some embodiments of the present disclosure. At operation 332, valid VTCs can be determined for blocks of memory cells. In some embodiments, VTCs can be determined for blocks by a memory sub-system data age and validity-based dispersion memory management component, such as the data age and validity-based memory management component 113 illustrated in FIG. 1.

At operation 333, a determination can be made whether the VTC is less than a validity threshold. As used herein, a "threshold," such as a validity threshold, generally refers to a designated quantity of valid translation units to provide an efficient memory management operation. For instance, a "validity threshold" generally refers to a given amount of valid translation units and/or a given amount of VTC (e.g., a given percentage) at which blocks that have a lower total amount of valid translation units and/or a lower VTC can be designated as candidate blocks. In some embodiments, a validity threshold can be equal to 20%, 15%, 10% or 5%, among other possible values. If the block has a VTC that has greater than or equal to the validity threshold, the flow 331 can return to operation 332 and the VTCs of blocks can continue to be determined. If, however, it is determined that the VTC of the block is less than the validity threshold, at operation 334, the block can be designated as a candidate block.

In some embodiments, a candidate block pool can be maintained. As used herein, a "candidate block pool" generally refers to a group of blocks which each have a respective VTCs that are each less than a validity threshold, while a "candidate block" generally refers to a block having a VTC that is less than a validity threshold. For instance, in some examples, a subset of memory blocks (e.g., NAND memory blocks) can be identified where an amount of valid data on each of the subset of the memory blocks is less than a validity threshold and/or less than respective amounts of valid data on each of the memory blocks not in the subset of memory blocks. In such examples, each memory block in the subset of the memory blocks can be designated as a candidate block. Designation of a candidate block can include alteration of information in a data structure such as a table associated with the block, among other possibilities. For instance, in some embodiments the flow 331 can include identification of an amount of valid data in each of the memory blocks, and sorting the memory blocks based on the amount of valid data in each of the memory blocks. Such sorting can promote comparison of the amounts of valid data in each of the memory blocks to a validity threshold, designation of candidate blocks, and/or other aspects related to age and validity-based memory management.

At operation 335, a rate of change of the VTC of the candidate blocks can be determined. In some embodiments, a rate of change of the VTC can be determined for each candidate block (e.g., for each candidate block in the candidate block pool). As mentioned, in some instances the rate of change of the VTC can be determined responsive to a change in a bin associated with a memory block (e.g., responsive to a change in a bin associated with a candidate block).

In some embodiments, a selection of a candidate block can be made based at least on the VTC of the candidate blocks. In some embodiments, a candidate block having a lowest VTC (of all the respective VTCs of the candidate blocks) can be selected. However, in some examples a candidate block other than the candidate block having the lowest VTC can be selected. Notably, in contrast to other approaches that do not account for a rate of a change in the VTC of the candidate block, approaches herein account for a rate of change in the VTC of the candidate block and, therefore can perform a particular type of media management operation on the candidate block. Accounting for a rate of changes in the VTC when performing a management operation can improve efficiencies (as compared to approaches such as those that do not account for a rate of change in the VTC of a memory block), for instance, by performing a media management operation (e.g., wear leveling operation such as static wear leveling operation) other than a garbage collection operation and therefore in such instances not incurring write amplification associated with a garbage collection operation.

At operation 336, the rate of change of the VTC can be compared to the bin transition rate. For instance, the rate of change of the VTC can be compared to an average bin transition rate, as described herein and as indicated at operation 337. At operation 338, a media management operation can be performed on the candidate block. In some embodiments, the media management operation can be a garbage collection operation or a wear leveling operation. Subsequent to performance of the media management operation, the flow 331 can return to operation 332 and VTCs of the blocks can be continued to be determined.

Figure 4:
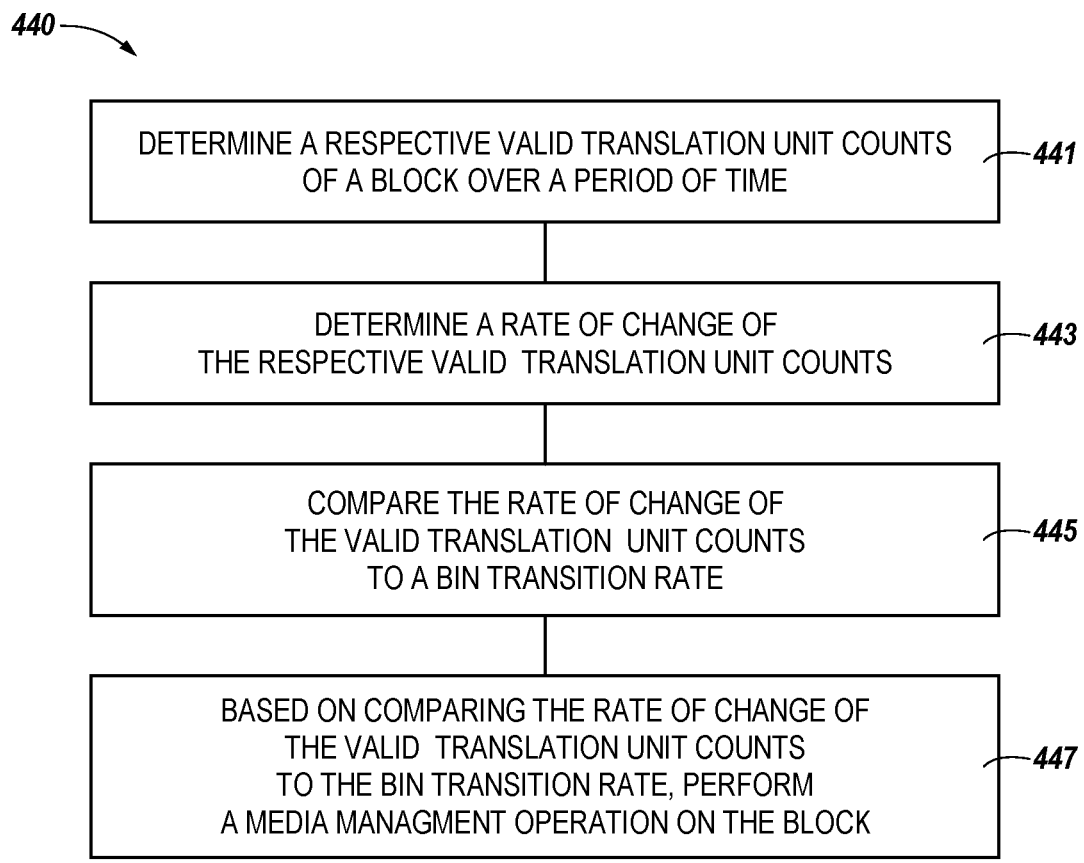
FIG. 4 is a flow diagram corresponding to a method for data age and validity-based memory management in accordance with some embodiments of the present disclosure.

FIG. 4 is flow diagram corresponding to a method 440 for memory dice arrangement in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the data age and validity-based memory management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 441, respective valid translation unit counts of a block of NAND memory cells can be determined over a period of time. The respective valid translation unit counts can be determined across each page, each plane, and/or each die of a memory block. In some embodiments, the method 440 can include determining a respective amount of valid translation unit counts of blocks of memory cells (e.g., one or more blocks of NAND memory cells) in a memory sub-system. In some embodiments, the memory sub-system can be analogous to the memory sub-system 110 illustrated in FIG. 1. As described above, the memory components can be memory dice or memory packages that are coupled to one another to create an array of memory cells, such as a three-dimensional stackable cross-gridded array of memory cells used by the memory sub-system to store data. For instance, in some embodiments, the stackable cross-gridded array can be a stackable cross-gridded array of groups of NAND memory cells.

In some embodiments, the method 440 can include determining the respective valid translation unit counts of the memory block by performing a media scan operation. Performing the media scan operation can include performing a Physical to Logical (P2L) scan and/or a Logical to Physical (L2P) scan, among other possible types of scans. The respective valid translation unit counts of the memory block (i.e., amount of valid data) can be determined as either a raw number or as a fraction or percentage of the total data on the memory block (i.e., the amount of valid data plus the amount of invalid data).

At operation 443, a rate of change of the respective valid translation unit counts of the block of NAND memory cells can be determined over the period of time, as described herein.

In some embodiments, the method 440 can include determining a bin transition rate. For instance, the method 440 can include determining respective bin transition rates of memory blocks of NAND memory cells over a period of time, and determining a bin transition rate as an average of the respective bin transition rates of the blocks of NAND memory cells.

In some embodiments, the method 440 can include detecting at least one change in an bin associated with the block of NAND memory cells, and determining the respective valid translation unit counts of the block of NAND memory cells at least in part by determining at least one valid translation unit count of the block of NAND memory cells responsive to the at least one change in the bin associated with the block of NAND memory cells. For instance, in some embodiments, the method 440 can include detecting two or more changes in bins associated with the block of NAND memory cells over the period of time, and determining the respective valid translation unit counts of the block of NAND memory cells at least in part by determining valid translation unit counts of the block of NAND memory cells responsive to each change in the two or more changes in the bins associated with the block of NAND memory cells.

In some embodiment, the method 440 can include determining the rate of change of the respective valid translation unit counts of the block of NAND memory cells, and determining the respective bin transition rates of the blocks of NAND memory cells over the same period of time. However, in some instances a time period for determining the rate of change of the respective valid translation unit counts of the block of NAND memory cells and/or determining the respective bin transition rates of the blocks of NAND memory cells can be different.

At operation 445, the rate of change of the valid translation unit counts can be compared to a bin transition rate. For instance, the rate of change of the valid translation unit counts can be less than, equal to, or greater than the bin transition rate.

At operation 447, a media management operation can be performed on the block of NAND memory cells based on the comparison, at operation 445. For instance, comparing at operation 445 can, in some embodiments, result in a determination that the rate of change of the valid translation unit counts is greater than the bin transition rate. In such embodiments, the method 440 can include performing the media management operation on the block of NAND memory cells by performing a garbage collection operation on the block of NAND memory cells. Conversely, comparing at operation 445 can, in some embodiments, result in a determination that the rate of change of the valid translation unit counts is less than the bin transition rate. In such embodiments, the method 440 can include performing the media management operation on the block of non-volatile (e.g., NAND memory cells) by performing a wear leveling operation (e.g., a static wear leveling operation) on the block of non-volatile memory cells.

In some embodiments, the method 440 can include performing the media management operation on the memory block (e.g., a block of NAND memory cells) at least by performing a folding operation on the memory block (e.g., a candidate block). As used herein, the term "candidate block" generally refers to a block of memory to be utilized for a memory management operation (e.g., a block having VTC that is less than a validity threshold). The first block of memory cells corresponds to a candidate block of memory cells that correspond to a first type of memory management operation. For example, the first block of memory cells can correspond to a candidate block for a time after programming (TAP) fold operation (or, for brevity, a "TAP fold"). In another example, the first block of memory cells can correspond to a candidate block for a static wear leveling (SWL) fold operation (or, for brevity, a "SWL fold"). In another examples, the first block of memory cells can correspond to a candidate block for a reliability (REL) fold operation (or, for brevity, a "REL fold"). Although specific examples of folding are provided, the present disclosure is not so limited. For example, other types of memory management operations can utilize candidate blocks in a similar way.

A TAP fold operation can include folding operations that are triggered due to degraded media integrity of data in the block owing to the charge loss associated with the amount of time elapsed after the block was programmed. For example, voltage drift with respect to one or more memory cells can occur based on the amount of time that the data is stored in the media (e.g., in a block of memory cells). In contrast, a REL fold can include folding operations that are triggered when the media integrity of data in the block has degraded due to block usage and access stresses. Block usage can include, but is not limited to: memory reads, memory cycling, memory read disturbs (e.g., read operation performed on one row of cells impacts a threshold voltage of unread cells).

In some embodiments, a destination block for the media management operation can be determined. As used herein, a "destination block" generally refers to a block to be utilized to transfer valid data to during a media management operation. In some examples, determining a destination block can be performed is based, at least in part, on the determined type of the media management operation. In some examples, the type of media management operation can correspond to a particular type of destination block. For example, the destination block can have a relatively low erase count (EC) rate when the type of media management operation employs a reliability fold. The destination block can have a relatively high erase count rate when the type of media management operation is a TAP fold and/or SWL fold. In this way, the reliability fold can correspond to a type of destination block with a relatively low EC and the TAP fold and SWL fold can correspond to a type of destination block with a relatively high EC. As used herein, an "erase count rate", "erase cycle rate", or "program erase cycle rate" generally refers to a quantity of erase cycles performed on a memory cell or portion of memory cells over a period of time. For example, a high EC rate for a first block of memory cells can indicate that the first block of memory cells has had a relatively high quantity of erase cycles performed over a period of time. In a similar example, a low EC rate for a second block of memory cells can indicate that the second block of memory cells has had a relatively low quantity of erase cycles performed over the period of time. The folding operation can include a foreground folding operation or a background folding operation. In some embodiments, the folding operation can be performed on valid data in respective valid translation units in the memory block.

Figure 5:
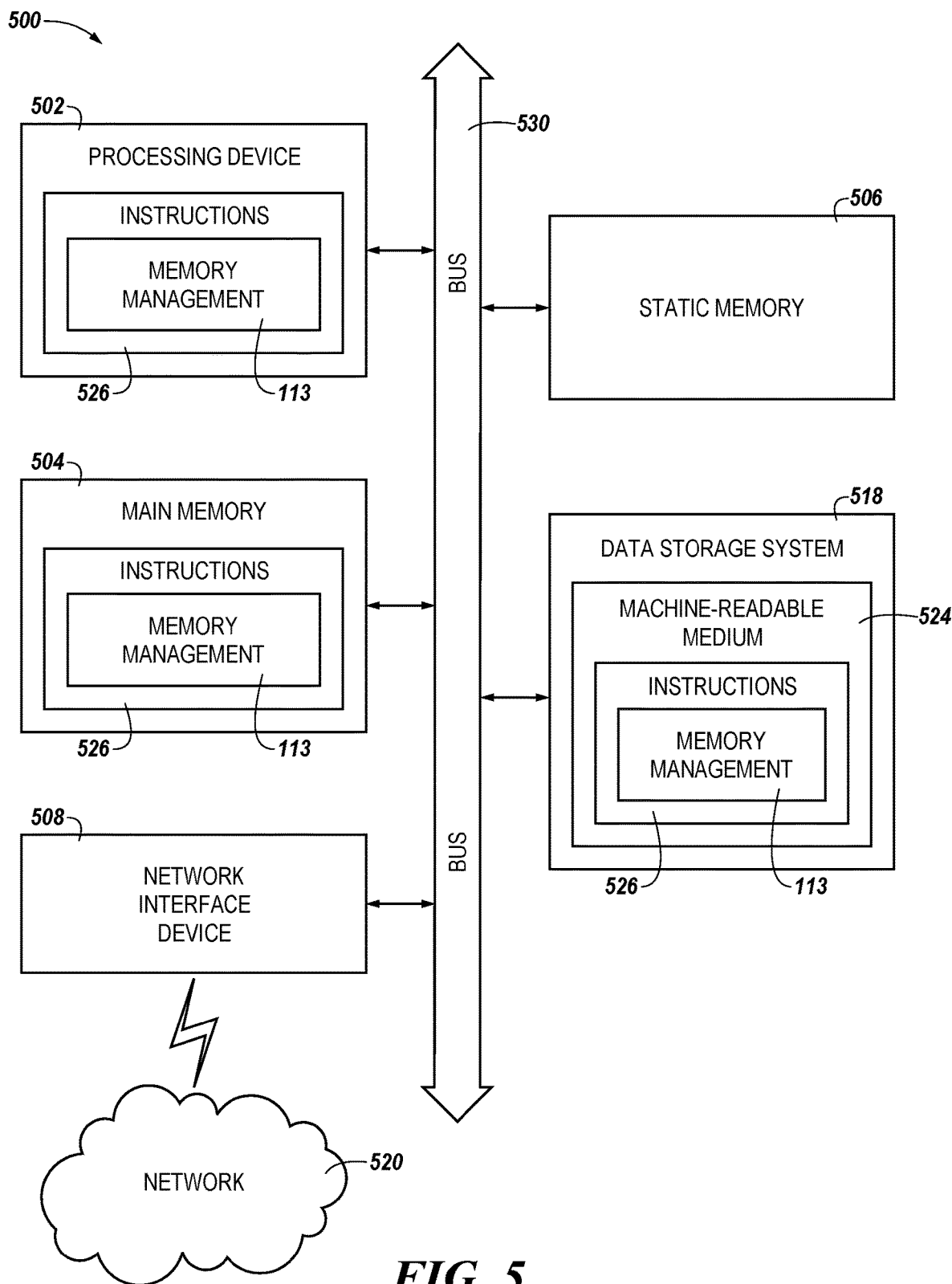
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data age and validity-based memory management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data age and validity-based management component (e.g., the data age and validity-based memory management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   determining respective valid translation unit counts of a block of non-volatile memory cells over a period of time;
   determining a rate of change of the respective valid translation unit counts of the block of non-volatile memory cells over the period of time;
   determining respective bin transition rates of a plurality of blocks of non-volatile memory cells over the period of time;
   determining an average bin transition rate of the respective bin transition rates;
   comparing the rate of change of the valid translation unit counts to the average bin transition rate; and
   based on comparing the rate of change of the valid translation unit counts to the average bin transition rate, performing a media management operation on the block of non-volatile memory cells.

2. The method of claim 1, further comprising:
   detecting at least one change in a bin associated with the block of non-volatile memory cells; and
   determining the respective valid translation unit counts of the block of non-volatile memory cells at least in part by determining at least one valid translation unit count of the block of non-volatile memory cells responsive to the at least one change in the bin associated with the block of non-volatile memory cells.

3. The method of claim 1, further comprising:
   detecting a plurality of changes in bins associated with the block of non-volatile memory cells over the period of time; and
   determining the respective valid translation unit counts of the block of non-volatile memory cells at least in part by determining valid translation unit counts of the block of non-volatile memory cells responsive to each change in the plurality of changes in the bins associated with the block of non-volatile memory cells.

4. The method of claim 1, further comprising performing the media management operation on the block of non-volatile memory cells at least by performing a folding operation on the block of non-volatile memory cells.

5. The method of claim 1, wherein the rate of change of the valid translation unit counts is greater than the average bin transition rate, and further comprising performing the media management operation on the block of non-volatile memory cells by performing a garbage collection operation on the block of non-volatile memory cells.

6. The method of claim 1, wherein the rate of change of the valid translation unit counts is less than the average bin transition rate, and further comprising performing the media management operation on the block of non-volatile memory cells by performing a wear leveling operation on the block of non-volatile memory cells.

7. The method of claim 6, wherein performing the wear leveling operation further comprises performing a static wear leveling operation on the block of non-volatile memory cells.

8. An apparatus, comprising:
a data age and validity-based memory management component configured to:
- determine respective rates of change in an amount of valid data in a plurality of non-volatile memory blocks of a memory component over a period of time;
- determine respective bin transition rates of the plurality of non-volatile memory blocks over the period of time;
- based on the respective bin transition rates of the plurality of non-volatile memory blocks over the period of time, determine an average bin transition rate over the period of time;
- compare the respective rates of change in the amount of the valid data to the average bin transition rate; and
- based on comparison of the respective rates of change in the amount of the valid data to the average bin transition rate, perform a media management operation on a non-volatile memory block of the plurality of non-volatile memory blocks.

9. The apparatus of claim 8, wherein the respective rates of change in the amount of valid data in the plurality of non-volatile memory blocks represent levels by which the amount of valid data in the plurality of non-volatile memory blocks has decreased over the period of time.

10. The apparatus of claim 8, wherein the respective bin transition rates of the plurality of non-volatile memory blocks represent a level by which an age of the amount of valid data in the plurality of non-volatile memory blocks has increased over the period of time.

11. The apparatus of claim 8, wherein the data age and validity-based memory management component is configured to:
- identify an amount of valid data on each of the plurality of non-volatile memory blocks; and
- sort the plurality of non-volatile memory blocks based on the amount of valid data on each of the plurality of non-volatile memory blocks.

12. The apparatus of claim 11, wherein the data age and validity-based memory management component is further configured to identify a subset of the plurality of non-volatile memory blocks, wherein the amount of valid data on each non-volatile memory block of the subset of the plurality of non-volatile memory blocks is less than the amount of valid data on each of the plurality of non-volatile memory blocks not in the subset of the plurality of non-volatile memory blocks.

13. A system, comprising:
a memory sub-system comprising a plurality of memory components arranged to form a stackable cross-gridded array of a plurality of blocks of memory cells; and
a processing device coupled to the plurality of memory components, the processing device to perform operations comprising:
- determining a respective valid translation unit counts of the plurality of blocks of memory cells;
- determining the respective valid translation unit counts of a subset of plurality of blocks of memory cells is less than a validity threshold;
- based on determining that the respective valid translation unit counts of the subset of the plurality of blocks of memory cells is less than the validity threshold, designating the subset as candidate blocks;
- determining a rate of change of a respective valid translation unit counts of a candidate block of the candidate blocks;
- comparing the rate of change of the valid translation unit counts to an average bin transition rate; and
- based on comparing the rate of change of the respective valid translation unit counts to the average bin transition rate, performing a media management operation on the candidate block.

14. The system of claim 13, wherein the processing device is to perform operations further comprising selecting the candidate block from the plurality of candidate blocks based on a current respective valid translation unit count of the candidate block.

15. The system of claim 14, further comprising selecting the candidate block by selecting a candidate block that has a lowest current respective valid translation unit count of the candidate blocks.

16. The system of claim 13, wherein performing the media management operation on the candidate block further comprises performing a folding operation on valid data in the respective valid translation units in the candidate block.

17. The system of claim 16, wherein performing the folding operation further comprises performing a foreground folding operation or a background folding operation.

18. The system of claim 13, wherein the stackable cross-gridded array of groups of memory cells further comprise a stackable cross-gridded array of a plurality of groups of replacement gate (RG) NAND memory cells.

* * * * *